(12) United States Patent
Dardas et al.

(10) Patent No.: US 11,584,538 B2
(45) Date of Patent: Feb. 21, 2023

(54) INERTING SYSTEM WITH PARTICULATE REMOVAL

(71) Applicant: Hamilton Sundstrand Corporation, Charlotte, NC (US)

(72) Inventors: Zissis A. Dardas, Worcester, MA (US); Ying She, East Hartford, CT (US); Sean C. Emerson, Broad Brook, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 859 days.

(21) Appl. No.: 16/453,982

(22) Filed: Jun. 26, 2019

(65) Prior Publication Data

US 2020/0407073 A1 Dec. 31, 2020

(51) Int. Cl.
*B64D 37/32* (2006.01)
*B64D 37/04* (2006.01)
*B01D 51/10* (2006.01)
*B01D 53/86* (2006.01)
*B01J 8/02* (2006.01)
*B01D 46/71* (2022.01)

(52) U.S. Cl.
CPC ............ *B64D 37/32* (2013.01); *B01D 46/71* (2022.01); *B01D 51/10* (2013.01); *B01D 53/86* (2013.01); *B01J 8/02* (2013.01); *B01D 2259/4575* (2013.01)

(58) Field of Classification Search
CPC ............ B01D 2259/4575; B01D 46/71; B01D 46/70; B01D 51/10; B01D 53/86; B64D 37/32; B01J 8/02
See application file for complete search history.

(56) References Cited

U.S. PATENT DOCUMENTS

| | | | |
|---|---|---|---|
| 9,102,416 | B1 | 8/2015 | Cutler |
| 9,874,126 | B2 | 1/2018 | Bailey et al. |
| 9,908,070 | B2 | 3/2018 | Carrion et al. |
| 10,179,308 | B2 | 1/2019 | Schaeffer et al. |
| 2018/0073406 | A1 | 3/2018 | Archetti |
| 2019/0185175 | A1 | 6/2019 | Dardas et al. |

FOREIGN PATENT DOCUMENTS

| | | |
|---|---|---|
| CN | 104843189 A | 8/2015 |
| WO | 2007008730 A2 | 1/2007 |

OTHER PUBLICATIONS

Extended European search report issued in corresponding EP application No. 19212073.1, dated Jun. 29, 2020.
EP Communication Pursuant to Art 94(3) EPC dated Jun. 28, 2022, issued during the prosecution of European Patent Application No. EP 19212073.1, 4 pages.

*Primary Examiner* — Timothy C Vanoy
(74) *Attorney, Agent, or Firm* — Locke Lord LLP; Scott D. Wofsy; Alicia J. Carroll

(57) ABSTRACT

An inerting system includes a fluid circuit, a reactor within the fluid circuit, at least one particulate removal device (PRD) downstream from the reactor, and a fluid tank. The fluid tank is downstream from the at least one PRD. A method for removing particulates from a fluid stream in a fluid circuit includes receiving a fluid stream in a reactor within a fluid circuit, outputting an exhaust stream from the reactor, receiving the exhaust stream in at least one PRD downstream from the reactor, removing particulate from the exhaust stream, and receiving the exhaust stream with particulate removed in a fluid tank downstream from the at least one PRD.

20 Claims, 2 Drawing Sheets

INERTING SYSTEM WITH PARTICULATE REMOVAL

BACKGROUND

1. Technological Field

The present disclosure relates to inerting systems, and more particularly to fuel tank inerting systems.

2. Description of Related Art

As fuel is consumed during flight, the fuel level in a fuel tank is lowered and the remaining oxygen in the ullage of the fuel tank is replaced with an inert gas. Generally, fuel tank inerting systems reduce the quantity of oxygen in a fuel tank vapor space, also known as an ullage, of an aircraft fuel tank in order to reduce its reactivity with any fuel vapor. Some fuel tank inerting systems use catalytic fuel tank inerting.

The conventional techniques have been considered satisfactory for their intended purpose. However, there is an ever present need for improved inerting systems. This disclosure may address at least one of these needs.

SUMMARY

An inerting system includes a fluid circuit, a reactor within the fluid circuit, at least one particulate removal device (PRD) downstream from the reactor, and a fluid tank. The fluid tank is downstream from the at least one PRD.

In some embodiments, the inerting system includes a heat exchanger downstream from the reactor and the at least one PRD, and a condenser downstream from the heat exchanger. The heat exchanger and the condenser can be upstream from the fluid tank. The inerting system can include a heat exchanger downstream from the reactor and a condenser downstream from the heat exchanger. The heat exchanger and the condenser can be upstream from the at least one PRD. A fluid stream in the fluid circuit can include liquid fuel, gaseous fuel, and/or air. The reactor can be a catalytic reactor.

The inerting system can include a heat exchanger downstream from the reactor. The at least one PRD can include two PRDs. A first one of the PRDs can be downstream from the reactor and upstream from the heat exchanger and wherein a second one of the PRDs can be downstream from the heat exchanger and upstream from the fluid tank. The least one PRD can be a flame arrestor including a metal material to reduce flame propagation throughout the fluid circuit. The at least one PRD can include a respective filter. The at least one PRD can have an inlet on an upstream side of the filter in fluid communication with the fluid circuit to receive reactor exhaust therefrom and the at least one PRD can have an outlet on a downstream side of the filter in fluid communication with a downstream portion of the fluid circuit to provide a filtered stream thereto.

In some embodiments, the at least one PRD is a regenerable PRD. The regenerable PRD can include a filter having backflow inlet and a particulate outlet. The backflow inlet and the particulate outlet can be separable from the fluid circuit. The fluid circuit can include an air inlet upstream from the reactor. The reactor can be in fluid communication with the fluid tank to receive fluid therefrom.

In accordance with another aspect, a method for removing particulates from a fluid stream in a fluid circuit includes receiving a fluid stream in a reactor within a fluid circuit, outputting an exhaust stream from the reactor, receiving the exhaust stream in at least one particulate removal device (PRD) downstream from the reactor, removing particulate from the exhaust stream, and receiving the exhaust stream with particulate removed in a fluid tank downstream from the at least one PRD.

The method can include providing the fluid stream to the reactor from the fluid tank. The method can include reducing flame propagation with the at least one PRD. The at least one PRD can be a flame arrestor including a metal material. The method can include regenerating the at least one PRD. Regenerating the at least one PRD can include opening a regenerating circuit including a backflow inlet and a particulate outlet. The regenerating circuit can be separable from the fluid circuit. Removing particulate from the exhaust stream includes removing particulate by centrifugal force.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
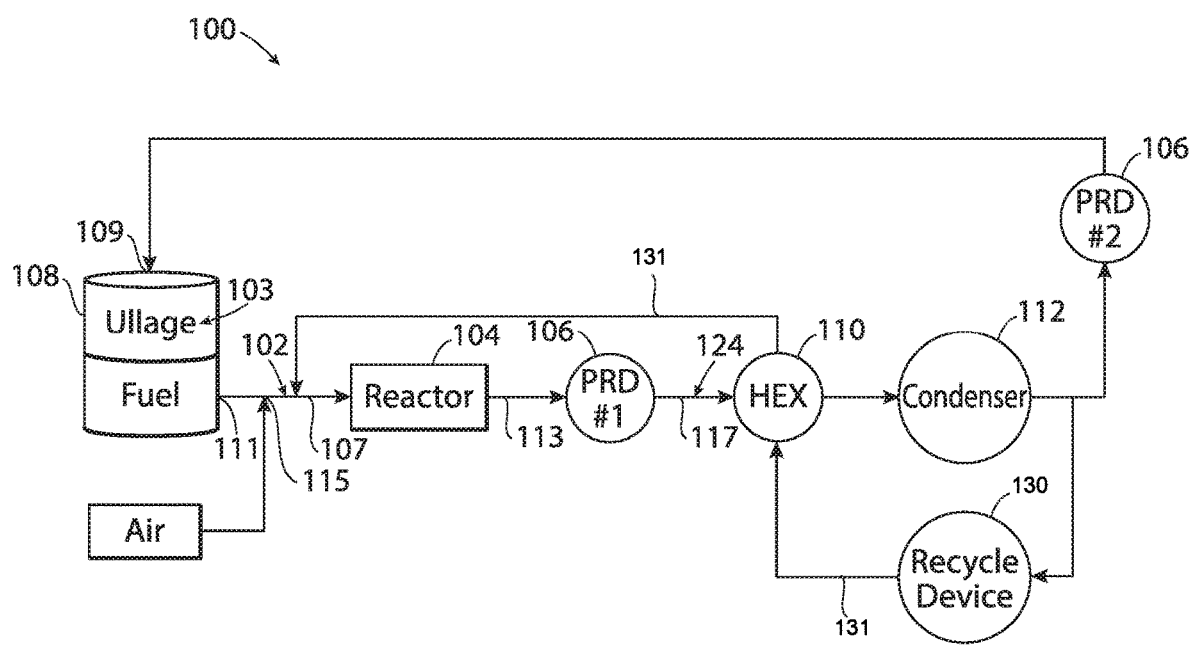
FIG. 1 is a schematic partial view of an exemplary embodiment of an inerting system constructed in accordance with the present disclosure, showing particulate removal devices.

Reference will now be made to the drawings wherein like reference numerals identify similar structural features or aspects of the subject disclosure. For purposes of explanation and illustration, and not limitation, a partial view of an exemplary embodiment of an inerting system in accordance with the disclosure is shown in FIG. 1 and is designated generally by reference character 100. Other embodiments of inerting systems in accordance with the disclosure, or aspects thereof, are provided in FIGS. 2A-2B, as will be described. The systems and methods described herein can be used to facilitate particulate removal from a fluid circuit in an inerting system.

As shown in FIG. 1, an inerting system 100 includes a fluid circuit 102, a reactor 104, e.g. a catalytic reactor, within the fluid circuit 102, particulate removal devices (PRD) 106 downstream from the reactor 104, and a fluid tank 108, e.g a fuel tank. As the fuel from tank 108 is consumed during operation, e.g. by one or more engines, an ullage space 103 forms within the fuel tank 108. To reduce flammability risks associated with vaporized fuel that may form within the ullage space 103, an inert gas can be generated by reactor 104 and fed into the ullage 103. Catalytic reactor 104 can be similar to those shown and described in U.S. Patent Publication No. 2019/0185175, the disclosure of which is incorporated herein by reference in its entirety. Wash-coated catalyst particulates from the catalyst monolith in the reactor 104 can be released during vibrations induced by aircraft landing, take-off and/or air flow in the reactor. With continued reference to FIG. 1, air is generally mixed with fuel in fluid circuit 102 upstream from the reactor 104 via an air stream entering at an air inlet 115 to form a mixed reactant stream 107. Particulates may also be present the air stream entering at air inlet 115 and can enter fluid circuit 102. These particulates, if uncontained, can end up in different parts of the flow system downstream of the reactor 104 and in fuel tank 108, creating potential issues (plugging valves, orifices, fuel pump parts, etc.), which can require significant maintenance or even aircraft grounding. PRDs 106 can reduce these particulates, thereby reducing the potential for the issues described above.

With continued reference to FIG. 1, a fluid stream in the fluid circuit 102 comprises liquid fuel, gaseous fuel, and/or air. Upstream from reactor 104, the fuel in fluid circuit 102 is largely in a liquid state and downstream from reactor 104, and upstream from condenser 112, the fuel in fluid circuit 102 has largely been vaporized. Inlet 109 into an ullage 103 of the fluid tank 108 is downstream from the PRDs 106 to receive filtered fluid therefrom. A first one of the PRDs 106 is downstream from the reactor 104 and upstream from the heat exchanger 110 and a second one of the PRDs 106 is downstream from the heat exchanger 110. In system 100, fluid tank 108 is a fuel tank, e.g. a fuel tank in an aircraft. Air inlet 115 is in fluid communication with fluid circuit 102 upstream from the reactor 104. The reactor 104 is in fluid communication with the fluid tank 108 and air inlet 115 (by way of fluid circuit 102) to receive fluid, e.g. mixed reactant stream 107, therefrom. Reactor 104 is downstream from an outlet 111 of fluid tank 108. The fluid stream exiting from reactor 104, e.g. an exhaust stream 113, is largely made up of nitrogen, $CO_2$, water, and any unreacted $O_2$ or fuel.

With continued reference to FIG. 1, the inerting system 100 includes a heat exchanger 110 downstream from the reactor 104 and a first one of the PRDs 106, and a condenser 112 downstream from the heat exchanger 110. The heat exchanger 110 and the condenser 112 are upstream from the inlet back into fluid tank 108. The heat exchanger 110 and the condenser 112 are upstream from a second one of PRDs 106 and largely act to cool and remove the water from the exhaust stream 113 exiting reactor 104. While system 100 is shown with two PRDs 106, it is contemplated that system 100 can have only one of the PRDs. For example, if the expected temperatures upstream from heat exchanger 110 are higher than suitable for the PRD, the first PRD 106 upstream from the heat exchanger 110 can be left out of the circuit and only the second PRD 106 (which is downstream from the heat exchanger 110) will be included in system 100. This enables the fluid in the circuit 102 to be cooled prior to filtration in the PRD 106. In some embodiments, system 100 optionally includes a recycle device 130 positioned downstream from reactor 104 drawing a portion of fluid from fluid circuit 102. Recycle device 130 can provide a recycled stream 131 back to fluid circuit 102 upstream of reactor 104. Those skilled in the art will readily appreciate that the water itself, the fluid stream without water (e.g., containing $CO_2$ and $N_2$), any unreacted $O_2$ or fuel, or some combination thereof, can be recycled to fluid circuit 102 upstream of reactor 104. Recycled stream 131 can pass through heat exchanger 110 to be heated before going back to fluid circuit 102.

Figure 2A:
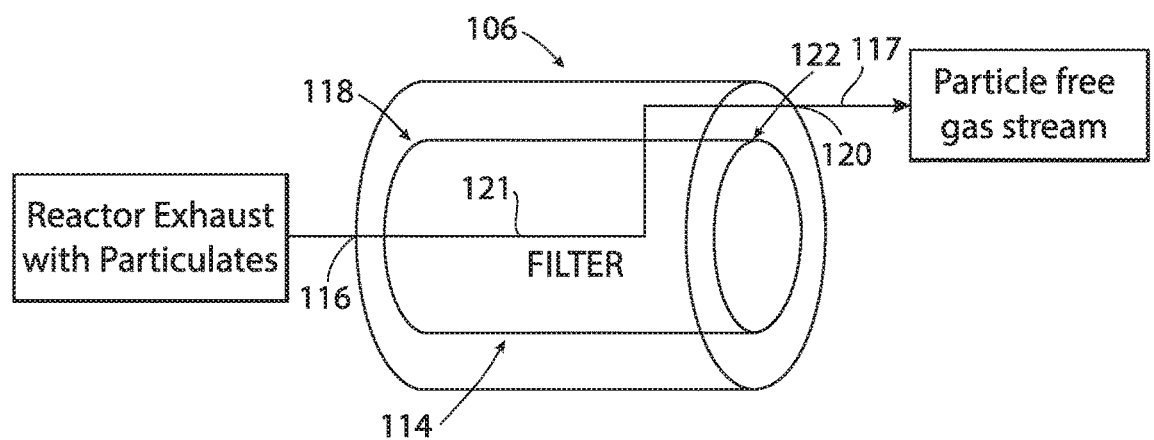
FIG. 2A is a schematic view of one of the particulate removal devices of FIG. 1, showing a filter.

As shown in FIGS. 1-2A, each PRD 106 includes a respective filter 114, wherein PRD 106 has an inlet 116 on an upstream side 118 of the filter 114 in fluid communication with the fluid circuit 102 to receive reactor exhaust therefrom and PRD 106 has an outlet 120 on a downstream side 122 of the filter 114. In first PRD 106, the outlet 120 is in fluid communication with a downstream portion 124 of the fluid circuit 102 to provide a filtered stream 117 thereto. Those skilled in the art will readily appreciate that PRDs 106 can be any suitable type of PRD, including filters of different configurations that "trap" the particles from the reactor effluent or remove them by centrifugal force. It is contemplated that the PRD 106 can also be a flame arrestor including a metal material, e.g. a metal casing, to reduce potential flame propagation throughout the fluid circuit 102.

Figure 2B:
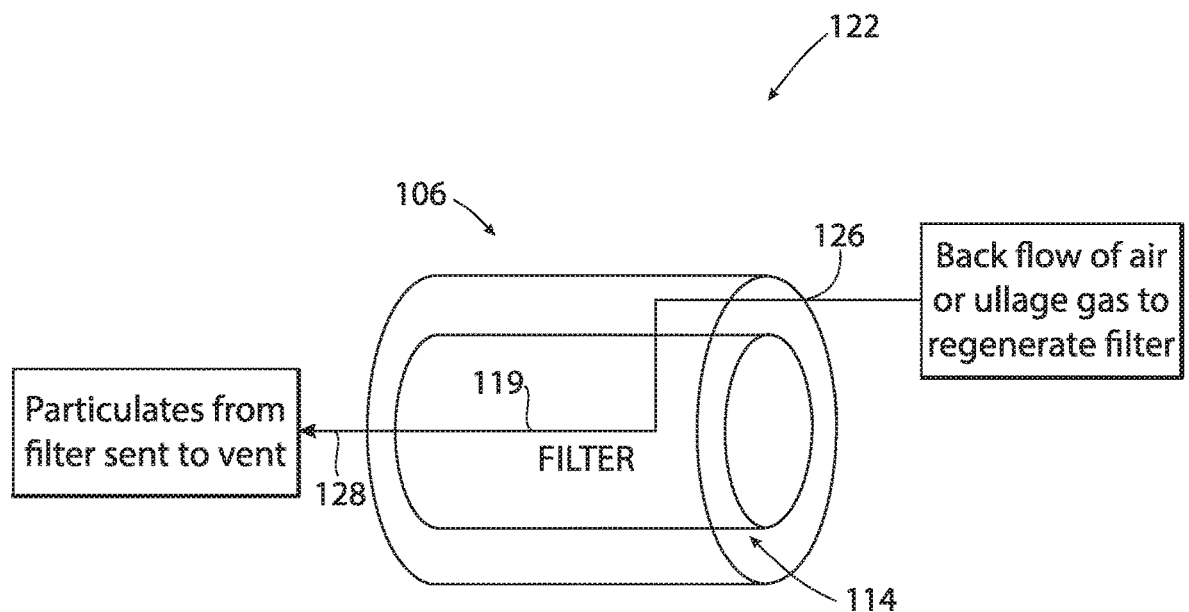
FIG. 2B is a schematic view of one of the particulate removal devices of FIG. 1, showing a regenerating circuit.

As shown in FIG. 2B, it is contemplated that at least one of the two PRDs 106 is a regenerable PRD. In the regenerable PRD 106, the filter 114 has a backflow inlet 126 and a particulate outlet 128, wherein the backflow inlet 126 and the particulate outlet 128 are separable from the fluid circuit 102. This allows for a back flow of air to enter inlet 126 and clean, e.g. "regenerate", the filter 114. Particulates removed/cleaned out of the filter 114 are sent via outlet 128 to a vent. A regenerating circuit 119 (defined between inlet 126 and vent outlet 128) is separate and isolated from the fluid circuit 102 and a filtration circuit 121 (defined between inlet 116 and outlet 120) so as not to contaminate the fluid circuit while particulates are being removed from filter 114. A series of valves on fluid circuit 102 can be used on either side of PRD 106 to close circuit 102 through PRD 106 during regeneration. Similarly, valves at inlet 126 and outlet 128 of circuit 119 can be used to close circuit 119 while flow through circuit 102 and, in turn, filtration circuit 121, is occurring.

A method for removing particulates from a fluid stream in a fluid circuit, e.g. fluid circuit 102, includes providing the fluid stream to a reactor, e.g. a catalytic reactor 104, from a fluid tank and air inlet, e.g. fuel tank 108 and air inlet 115. The fluid stream in the fluid circuit generally comprises air from the air inlet and fuel from the fuel tank. The method includes receiving the fluid stream in the reactor within the fluid circuit, outputting an exhaust stream, e.g. exhaust stream 113, from the reactor, and receiving the exhaust stream in at least one particulate removal device (PRD), e.g. PRD 106, downstream from the reactor. The method includes removing particulate from the exhaust stream, and receiving the exhaust stream, with the particulate removed, in the fluid tank downstream from the at least one PRD. The method includes reducing flame propagation with the at least one PRD. The at least one PRD is a flame arrestor including a metal material. The method includes regenerating the at least one PRD. Regenerating the at least one PRD includes opening a regenerating circuit, e.g. a regenerating circuit 119, including a backflow inlet, e.g. backflow inlet 114, and a particulate outlet 128. The regenerating circuit is separable from the fluid circuit.

The methods and systems of the present disclosure, as described above and shown in the drawings, provide for fuel inerting systems and injector assemblies with superior properties including improved mixing with low pressure loss. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. An inerting system comprising:
a fluid circuit;
a reactor within the fluid circuit;
at least one particulate removal device (PRD) downstream from the reactor;
a fluid tank downstream from the at least one PRD;

a heat exchanger downstream from the reactor and the at least one PRD; and a condenser downstream from the heat exchanger, wherein the heat exchanger and the condenser are upstream from the fluid tank.

2. The inerting system as recited in claim 1, wherein a fluid stream in the fluid circuit comprises at least one of liquid fuel, gaseous fuel, and/or air.

3. The inerting system as recited in claim 1, wherein the reactor is a catalytic reactor.

4. The inerting system as recited in claim 1, wherein the fluid circuit includes an air inlet upstream from the reactor.

5. The inerting system as recited in claim 1, wherein the reactor is in fluid communication with the fluid tank to receive fluid therefrom.

6. An inerting system comprising:
a fluid circuit;
a reactor within the fluid circuit;
at least one particulate removal device (PRD) downstream from the reactor;
a fluid tank downstream from the at least one PRD;
a heat exchanger downstream from the reactor and a condenser downstream from the heat exchanger, wherein the heat exchanger and the condenser are upstream from the at least one PRD.

7. The inerting system as recited in claim 6, further comprising a heat exchanger downstream from the reactor and the at least one PRD, and a condenser downstream from the heat exchanger, wherein the heat exchanger and the condenser are upstream from the fluid tank.

8. The inerting system as recited in claim 6, wherein a fluid stream in the fluid circuit comprises at least one of liquid fuel, gaseous fuel, and/or air.

9. The inerting system as recited in claim 6, wherein the reactor is a catalytic reactor.

10. An inerting system comprising:
a fluid circuit;
a reactor within the fluid circuit;
at least one particulate removal device (PRD) downstream from the reactor;
a fluid tank downstream from the at least one PRD; and
a heat exchanger downstream from the reactor, wherein the at least one PRD includes two PRDs, wherein a first one of the PRDs is downstream from the reactor and upstream from the heat exchanger and wherein a second one of the PRDs is downstream from the heat exchanger and upstream from the fluid tank.

11. An inerting system comprising:
a fluid circuit;
a reactor within the fluid circuit;
at least one particulate removal device (PRD) downstream from the reactor; and
a fluid tank downstream from the at least one PRD, wherein the at least one PRD is a flame arrestor including a metal material to reduce flame propagation throughout the fluid circuit.

12. An inerting system comprising:
a fluid circuit;
a reactor within the fluid circuit;
at least one particulate removal device (PRD) downstream from the reactor; and
a fluid tank downstream from the at least one PRD, wherein the at least one PRD includes a respective filter, wherein the at least one PRD has an inlet on an upstream side of the filter in fluid communication with the fluid circuit to receive reactor exhaust therefrom and wherein the at least one PRD has an outlet on a downstream side of the filter in fluid communication with a downstream portion of the fluid circuit to provide a filtered stream thereto.

13. An inerting system comprising:
a fluid circuit;
a reactor within the fluid circuit;
at least one particulate removal device (PRD) downstream from the reactor; and
a fluid tank downstream from the at least one PRD, wherein the at least one PRD is a regenerable PRD, wherein the regenerable PRD includes a filter having backflow inlet and a particulate outlet, wherein the backflow inlet and the particulate outlet is separable from the fluid circuit.

14. A method for removing particulates from a fluid stream in a fluid circuit comprising:
receiving a fluid stream in a reactor within a fluid circuit;
outputting an exhaust stream from the reactor;
receiving the exhaust stream in at least one particulate removal device (PRD) downstream from the reactor;
removing particulate from the exhaust stream; and
receiving the exhaust stream with particulate removed in a fluid tank downstream from the at least one PRD; and
reducing flame propagation with the at least one PRD, wherein the at least one PRD is a flame arrestor including a metal material.

15. The method as recited in claim 14, further comprising providing the fluid stream to the reactor from at least one of the fluid tank and/or an air inlet.

16. The method as recited in claim 14, wherein the fluid stream comprises at least one of liquid fuel, gaseous fuel and/or air.

17. The method as recited in claim 14, wherein the reactor is a catalytic reactor.

18. A method for removing particulates from a fluid stream in a fluid circuit comprising:
receiving a fluid stream in a reactor within a fluid circuit;
outputting an exhaust stream from the reactor;
receiving the exhaust stream in at least one particulate removal device (PRD) downstream from the reactor;
removing particulate from the exhaust stream;
receiving the exhaust stream with particulate removed in a fluid tank downstream from the at least one PRD; and
regenerating the at least one PRD, wherein regenerating the at least one PRD includes opening a regenerating circuit including a backflow inlet and a particulate outlet, wherein the regenerating circuit is separable from the fluid circuit.

19. The method as recited in claim 18, further comprising reducing flame propagation with the at least one PRD, wherein the at least one PRD is a flame arrestor including a metal material.

20. A method for removing particulates from a fluid stream in a fluid circuit comprising: receiving a fluid stream in a reactor within a fluid circuit;
outputting an exhaust stream from the reactor;
receiving the exhaust stream in at least one particulate removal device (PRD) downstream from the reactor;
removing particulate from the exhaust stream;
receiving the exhaust stream with particulate removed in a fluid tank downstream from the at least one PRD wherein removing particulate from the exhaust stream includes removing particulate by centrifugal force.

* * * * *